United States Patent
Parente et al.

(10) Patent No.: US 9,507,341 B2
(45) Date of Patent: Nov. 29, 2016

(54) SIBLING LOT PROCESSING

(71) Applicant: INTERNATIONAL BUSINESS MACHINES CORPORATION, Armonk, NY (US)

(72) Inventors: Manuel Parente, Williston, VT (US); Kenneth D. Rocheleau, South Hero, VT (US); Satyadeep Vajjala, Colchester, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 840 days.

(21) Appl. No.: 13/866,324

(22) Filed: Apr. 19, 2013

(65) Prior Publication Data

US 2014/0316548 A1   Oct. 23, 2014

(51) Int. Cl.
*G05B 19/418* (2006.01)

(52) U.S. Cl.
CPC .......... *G05B 19/41865* (2013.01); *G05B 2219/32266* (2013.01); *Y02P 90/20* (2015.11)

(58) Field of Classification Search
CPC .......... G05B 19/41865; G05B 2219/32266; G05B 2219/45031; G06Q 10/087; Y02P 90/20

USPC .................................................. 700/100, 101
See application file for complete search history.

(56) References Cited

U.S. PATENT DOCUMENTS

| | | | |
|---|---|---|---|
| 6,728,587 B2 * | 4/2004 | Goldman | G05B 19/41865 700/108 |
| 7,257,454 B2 | 8/2007 | Chien | |
| 7,729,936 B2 | 6/2010 | Chien et al. | |
| 7,904,192 B2 * | 3/2011 | Chua | G06Q 10/06 700/100 |
| 8,160,735 B2 * | 4/2012 | Sinclair | G06Q 10/00 700/100 |
| 2003/0233290 A1 | 12/2003 | Yang et al. | |
| 2007/0225848 A1 | 9/2007 | Chang et al. | |
| 2007/0239302 A1 | 10/2007 | Burda et al. | |
| 2009/0326996 A1 * | 12/2009 | Goh | G06Q 10/0633 705/7.27 |

* cited by examiner

*Primary Examiner* — Christopher E Everett

(74) *Attorney, Agent, or Firm* — David Cain; Andrew M. Calderon; Roberts Mlotkowski Safran Cole & Calderon, P.C.

(57) ABSTRACT

A supply chain management system for controlling component processes includes a computer device that is adapted to: detect a plurality of component processes; create a relative value of each one of the plurality of component processes; prioritize each one of the plurality of component processes according to sibling relationships; and control a flow of the plurality of component processes in a manufacturing line based on the prioritizing.

18 Claims, 7 Drawing Sheets

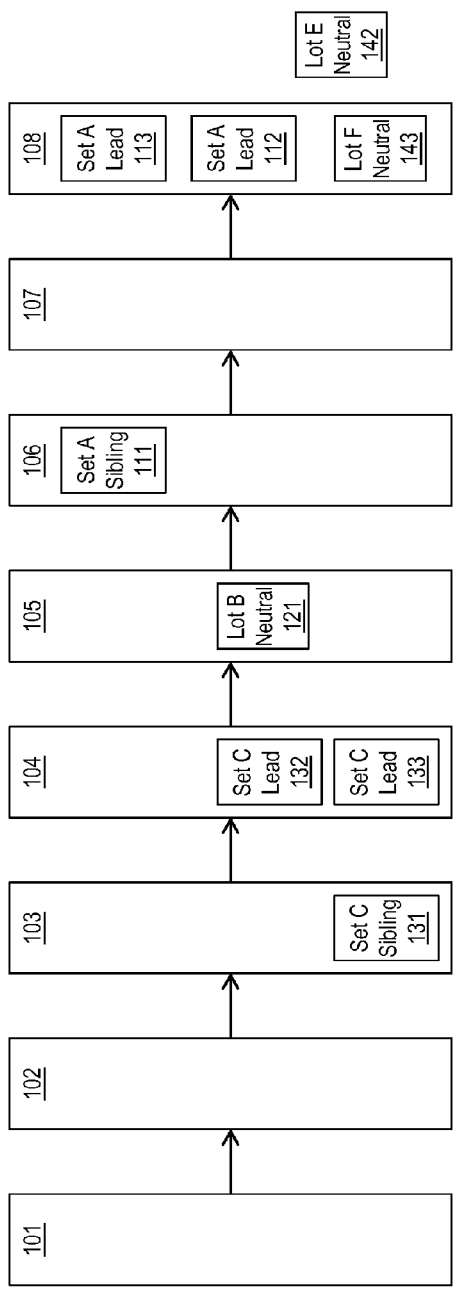

| Lot ID | Demand Date | Base Priority | Gate | Sibling Priority | Composite Priority |
|---|---|---|---|---|---|
| UU | 12.02.2012 | 17 | 8850 | 4 | 17.4 |
| VV | 12.02.2012 | 17 | 8850 | 5 | 17.5 |
| VV | 12.05.2012 | 23 | 8850 | 5 | 23.5 |
| XX | 12.05.2012 | 23 | 8825 | 3 | 23.3 |
| YY | 12.05.2012 | 23 | 8820 | 3 | 23.3 |
| ZZ | 12.05.2012 | 23 | 8820 | 4 | 23.4 |

FIG. 6

SIBLING LOT PROCESSING

FIELD OF THE INVENTION

The invention relates to managing manufacturing processes and, more particularly, to prioritization for lot dispatching in manufacturing processes.

BACKGROUND

The dispatching of production lots in a prioritized and scheduled fashion provides for smooth and reliable operation of a manufacturing system. Shop floor scheduling systems may be used to decide the sequence of a set of queued lots to dispatch to a given tool in the manufacturing line. For simple manufacturing systems, a first-in-first-out (FIFO) rule is often a reasonable choice. However, in semiconductor manufacturing, there are various tool-specific and lot-specific scheduling attributes which make this a poor or infeasible choice.

Semiconductor manufacturing utilizes a variety of tools and steps, and a production lot typically undergoes a large number of discrete processing steps during manufacture. It is common for different production lots to be simultaneously processed through a manufacturing line (e.g., for different products and/or different customers), which requires sharing of tools amongst the various lots. These complexities of the manufacturing process and the pressures exhibited by the customers (e.g., delivery times, reducing lead time, etc.) require that some lots be split into separate smaller lots to improve the speed of the lot movement through the manufacturing line. This splitting of lots allows the supply chain to better meet the delivery requirements, e.g., by permitting incremental deliveries to the customer, but also causes the individual units of an original single production lot to become spread out over the length of the manufacturing line.

In semiconductor manufacturing, the quality of manufactured units (e.g., integrated circuit chips) can be highly dependent on the silicon wafer in which the units are built. In light of this, and for quality tracking and control, some customers request that delivered units be built from a same lot and/or that lots of end product assemblies be made of same component lots. However, the splitting of a single lot into plural sub-lots throughout the manufacturing line can affect the delivery of a group of units, since large gaps can form between related sub-lots in the manufacturing line.

SUMMARY

In a first aspect of the invention, there is a supply chain management system for controlling component processes. The system includes a computer device that is adapted to: detect a plurality of component processes; create a relative value of each one of the plurality of component processes; prioritize each one of the plurality of component processes according to sibling relationships; and control a flow of the plurality of component processes in a manufacturing line based on the prioritizing.

In another aspect of the invention, there is a method of managing lots in a supply chain. The method includes identifying a plurality of lots and determining a base priority for each of the plurality of lots. The method also includes assigning a sibling-type priority to each of the plurality of lots. The method further includes controlling flow of the plurality of lots based on the base priority of each of the plurality of lots and the sibling-type priority of each of the plurality of lots. The determining, the assigning, and the controlling are performed by a computer device.

In another aspect of the invention, there is a computer program product for managing lots, the computer program product including a computer readable storage medium having program code embodied therewith. The program code is readable and/or executable by a processor of a computer device to perform a method including: identifying, by the processor, lots in a manufacturing line; determining, by the processor, a base priority for each of the lots; identifying, by the processor, sibling sets of the lots; assigning, by the processor, a sibling-type priority to each of the lots; and controlling, by the processor, movement of the lots at discrete locations in the manufacturing line based on a combination of the base priority for each of the lots and the sibling-type priority of each of the lots.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 2-5 show block diagrams of managing the flow of lots in accordance with the invention;

FIG. 6 shows an exemplary data structure for prioritizing lots in accordance with the invention;

DETAILED DESCRIPTION

The invention relates to managing manufacturing processes and, more particularly, to prioritization for lot dispatching in manufacturing processes. According to aspects of the invention, sibling lots are identified in a supply chain, and the flow of the sibling lots is tracked and managed throughout the supply chain. Sibling lots are smaller lots that are created when a larger parent lot is split up, e.g., when a single lot of silicon wafers is split into plural sub-lots of the wafers. In embodiments, all of the lots in a supply chain are provided with a priority modification based on status as a sibling lot, and this priority modification is used to control the flow of all lots (e.g., sibling and non-sibling lots) through the supply chain. Aspects of the invention are used to increase the priority of sibling lots that are trailing behind their related sibling lots, e.g., when the sibling lots have become spread out over various processes/steps/tools in a manufacturing line. In this manner, implementations of the invention minimize the time between completion of the first sibling lot and the last sibling lot of a related set of sibling lots.

Splitting lots provides for incremental deliveries to the customer, which gets product to the customer faster. The use of sibling logic in accordance with aspects of the invention assures that split lots converge (e.g., remain together) as they move through the line, so that incremental deliveries are from the same parent lot instead of different parent lots. Implementations of the invention provide prioritization that enables end-to-end lot moves which delay lead lots and/or accelerate sibling lots, which maximizes sequential convergence of same parentage lots at time of delivery at the end of the pipeline. Although delivery may be incremental and spread out in time, aspects of the invention minimize deliveries of mixed-parentage lots. Implementations of the invention are not limited to semiconductor manufacture, and instead have applicability in all process industries including, but not limited to, pharmaceuticals, distilleries, etc. Any process industry that has a concept of a parent lot of material, subsequently split for manufacturing efficiency but requiring lot level traceability to parent and may benefit by sibling convergence at the end of pipeline, e.g., to support all-or nothing or sequential incremental deliveries that minimize cross parentage mixing at delivery time.

Figure 1:
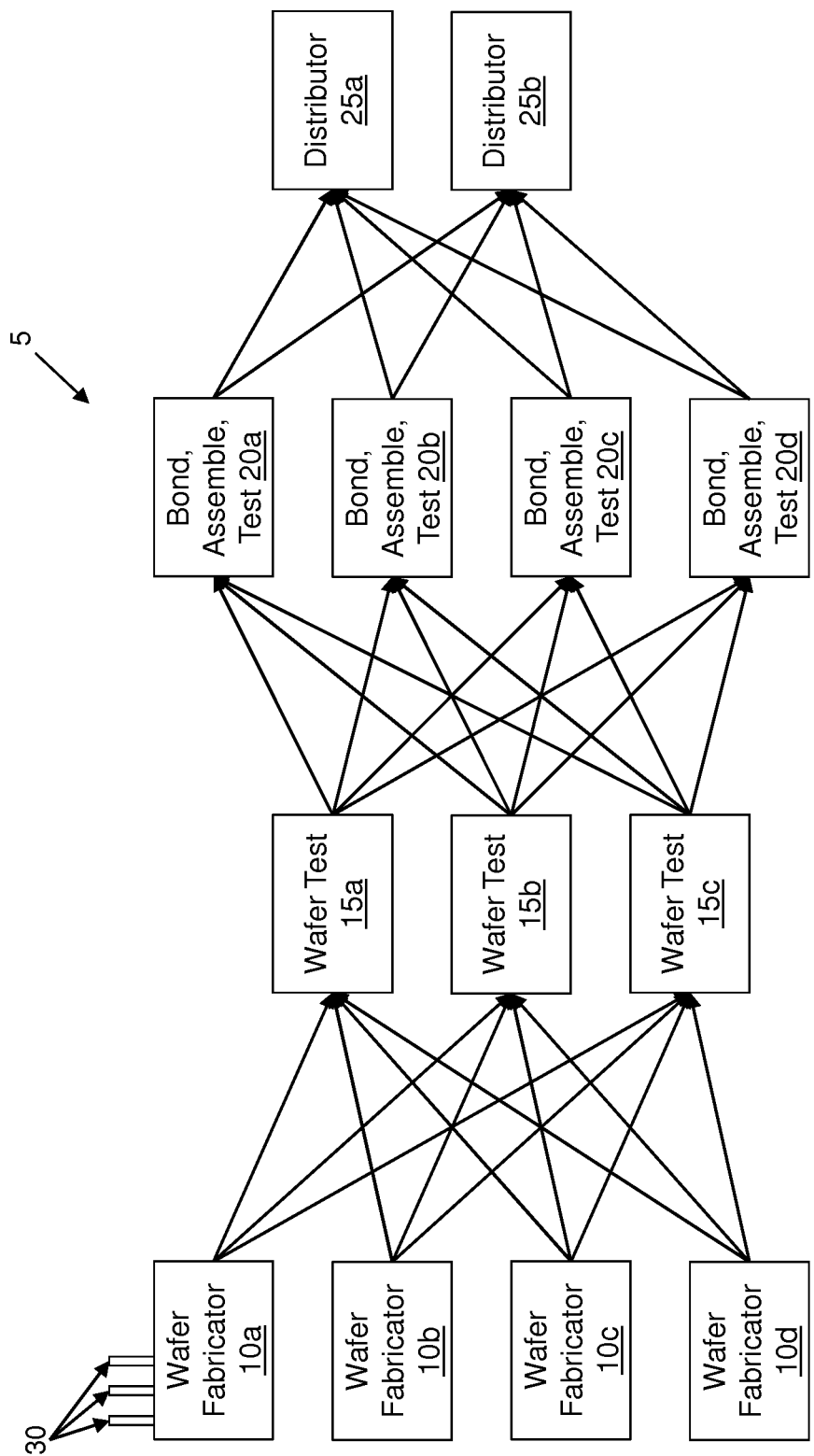
FIG. 1 shows a block diagram of an exemplary supply chain for manufacturing and supplying goods.

FIG. 1 shows a block diagram of an exemplary supply chain 5 for manufacturing and supplying goods to customers. As but one example, the supply chain may be for manufacturing and supplying integrated circuit devices (e.g., chip modules, etc.) to customers. Nodes in the supply chain may be spread out over plural geographic locations. For example, the first four nodes 10a-d may represent four different wafer fabrication facilities at four different geographic locations. The second nodes 15a-c may represent different wafer test facilities. The third nodes 20a-d may represent different bond, assembly, and test facilities. And the fourth nodes 25a-b may represent different distributor facilities.

Some of the nodes may be at a same geographic location. For example, nodes 10a, 15a, and 20a may all be located at a same site and operated by a single entity. Other ones of the nodes may be at different geographic locations and/or operated by different entities (e.g., suppliers, vendors, distributors, etc.). Moreover, within each node there may be plural discrete locations (e.g., gates 30) at which WIP (work in process) is processed and/or queued for processing.

As but one example, a single lot of silicon wafers (e.g., a parent lot) may be produced at a wafer fabricator 10a. Other lots may also be present at the same wafer fabricator 10a at the same time as the parent lot. Based on manufacturing execution system rules (e.g., base priority of the parent lot and the other lots, available tools, range management, etc.), the parent lot may be split into plural sibling lots while still at the wafer fabricator 10a. For example, a parent lot containing twenty-five wafers may be split into two sibling lots containing ten and fifteen wafers, respectively. The sibling lots may be spread out amongst the plural gates 30 at wafer fabricator 10a. Moreover, some of these related sibling lots may undergo wafer testing at node 15a, whereas other ones of the related sibling lots may undergo wafer testing at another geographic location at node 15b. In this manner, the related sibling lots (e.g., all the sibling lots that came from a same parent) can become spread out over plural ones of the various nodes, and at various gates within each node. The invention is not limited to the example of FIG. 1, and aspects of the invention may be used with any configuration of supply chain including any number and/or type and/or geographic location of nodes.

In accordance with aspects of the invention, sibling lots that are spread out over a supply chain (e.g., such as described with respect to FIG. 1) are identified, and the flow of all lots in the supply chain is managed to minimize the spread of a set of related sibling lots, e.g., to minimize the gap between a forward-most sibling lot (e.g., the lead sibling lot) and a rear-most sibling lot (e.g., the tail sibling lot). In embodiments, the flow of all the lots in the supply chain is managed by assigning a sibling-based priority to each lot, and processing lots in accordance with rules according to the sibling-based priority, e.g., as described with respect to the block diagrams in FIGS. 2-5.

FIGS. 2-5 show block diagrams of exemplary flow management in accordance with aspects of the invention. Gates 101-108 represent sequential and discrete processing and/or queuing locations in a process route of a balanced manufacturing line. WIP that is being processed along the process route is processed first at gate 101, then moved to gate 102, then moved to gate 103, etc. The gates 101-108 may correspond to locations within the supply chain 5 shown in FIG. 1. For example, all of the gates 101-108 may be at a single location, such as wafer fabricator 10a. Alternatively, the gates 101-108 may be spread across various locations; for example, gates 101-103 may be at a first geographic location at wafer fabricator 10a, and gate 104-108 may be at a second, different geographic location at wafer test 15b. The invention is not limited to the number of gates shown in FIGS. 2-5, and aspects of the invention may be used with any process route containing any desired number of gates or similar locations.

Elements 111-113, 121, 131-133, and 141-143 represent discrete lots of WIP (e.g., semiconductor wafers) at various ones of the gates 101-108 along the process route. In this example, lots 111-113 are a set of sibling lots (also referred to as a sibling set) that were created by splitting a single parent lot into these three smaller lots, and this relationship is denoted in FIGS. 2-5 by the designation "Set A". Similarly, lots 131-133 are another set of sibling lots that were created by splitting another parent lot into the three smaller lots, and this relationship is denoted in FIGS. 2-5 by the designation "Set C". Lot 121 is not a sibling lot and is denoted by the designation "Lot B". Similarly, none of lots 141-143 are included in a set of sibling lots, and these lots are denoted by the designation "Lot D/E/F". The invention is not limited to the number of lots and/or types of lots shown in FIGS. 2-5, and aspects of the invention may be used with any number and/or types of lots.

In embodiments, each lot in a supply chain is assigned a base priority that is based on, for example, a demand date or delivery date. In the example of FIGS. 2-5, and for illustration purposes only, each of the lots 111-113, 121, 131-133 has a same base priority equal to a first value, and each of the lots 141-143 has a same base priority equal to a second value that is different than the first value. In this manner, lots 141-143 have a different base priority than that of lots 111-113, 121, 131-133. Base priority may also be referred to as demand priority.

According to aspects of the invention, each lot in a supply chain is assigned a sibling-type priority that is one of: lead, sibling, and neutral. In embodiments, a lot is assigned 'lead' priority when it is: (i) included in a set of sibling lots and (ii) not behind any other lots of the set along the process route. Moreover, a lot is assigned 'sibling' priority when it is: (i) included in a set of sibling lots and (ii) behind at least one other lot of the set along the process route. Furthermore, a lot is assigned 'neutral' priority when it is not included in a set of sibling lots. In embodiments, the sibling-type priority is used in addition to the base priority to manage the flow of all the lots along the process route to compress the distance (e.g., number of gates) that a set of sibling lots are spread out over the process flow.

Figure 2:
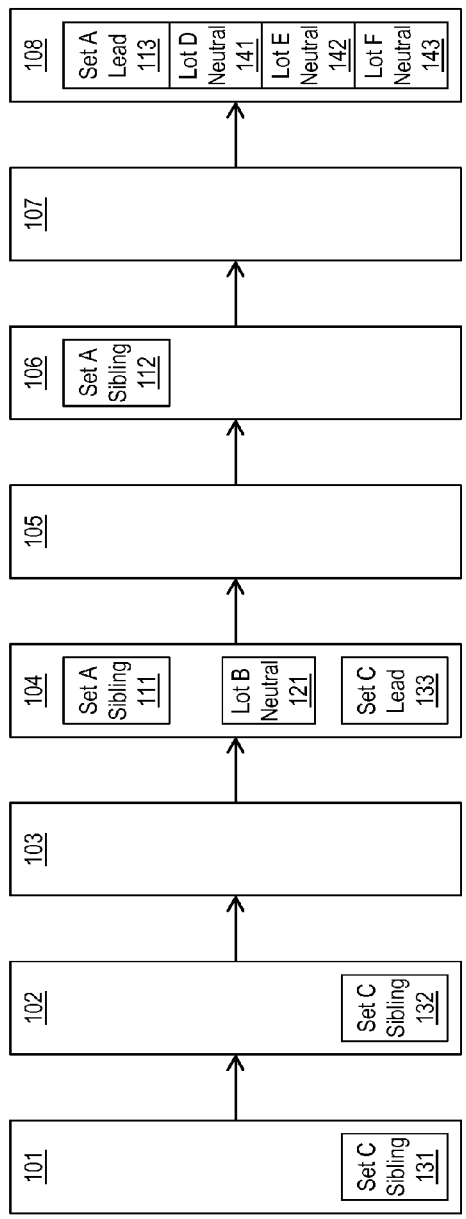

For example, in FIG. 2, lot 113 is assigned a sibling-type priority of 'lead' and lots 111 and 112 are each assigned a sibling-type priority of 'sibling'. This is because, for the sibling set 111-113, lot 113 is ahead of lots 111 and 112 along the process route (e.g., lot 113 is furthest downstream at gate 108 whereas lot 111 is at gate 104 and lot 112 is at gate 106). Similarly, for the sibling set 131-133, lot 133 is ahead of lots 131 and 132 along the process route because lot 133 is at gate 104 whereas lot 131 is at gate 101 and lot 132 is at gate 102. As such, lot 133 is assigned a sibling-type priority of 'lead' and lots 131 and 132 are each assigned a sibling-type priority of 'sibling'. Lots 121 and 141-143 are each assigned a sibling-type priority of 'neutral' since they none of these lots is included in a set of sibling lots. It should be understood that the invention is not limited to the designations 'lead', 'sibling', and 'neutral', and any suitable designations (including numeric designations) may be used in conjunction with the assigned sibling-type priorities.

Still referring to FIG. 2, when it is time to advance lots in the process route, the floor control system (FCS) and/or manufacturing execution system (MES) selects one lot at each gate to advance to the next gate. According to aspects of the invention, the selection of which lot to move from a gate having plural lots is based on rules that utilize the base priority and the sibling-type priority of each lot. In embodiments, for a gate that contains plural lots with different base priorities (e.g., gate 108 in FIG. 2), the lot with the higher base priority (e.g., more urgent demand priority) is moved ahead before the lot with the lower base priority (e.g., less urgent demand priority). Also in embodiments, for a gate that contains plural lots all having a same base priority (e.g., gate 104 in FIG. 2), 'sibling' lots are moved before 'neutral' lots, and 'neutral' lots are moved before 'lead' lots. When a gate contains only a single lot (e.g., gate 106 in FIG. 2), that lot is advanced to the next gate, irrespective of the sibling-type priority.

For example, in FIG. 2, gates 101, 102, and 106 each contain only a single lot (e.g., lot 131 at gate 101, lot 132 at gate 102, and lot 112 at gate 106). Accordingly, when it is time to advance lots in the balanced pipeline, each of these gates will advance their respective lot to the next gate. This movement is depicted in FIG. 3 which shows lot 131 advanced to gate 102, lot 132 advanced to gate 103, and lot 112 advanced to gate 107.

With continued reference to FIG. 2, gate 104 contains plural lots 111, 121, and 133, all of which have the same base priority. Lot 111 has a sibling priority, lot 121 has a neutral priority, and lot 133 has a lead priority. As such, and in accordance with aspects of the invention, lot 111 is selected for advancement from gate 104 (e.g., as depicted in FIG. 3) over lots 121 and 133 based on the sibling-type priority of these lots. Implementations of the invention thus force the selection of sibling priority lots over neutral priority and lead priority lots when possible.

Still referring to FIG. 2, gate 108 contains plural lots 113 and 141-143. Lot 113 has a relatively low base priority, while lots 141-143 each has a relatively high base priority. This difference in base priority may result, for example, from lots 141-143 having an earlier (e.g., sooner) demand date than lot 113. According to aspects of the invention, one of the lots with the higher base priority is selected for advancement over the lot with the lower base priority (e.g., lot 113). This is illustrated in FIG. 3 which shows lot 141 advancing from gate 108 while lot 113 remains at gate 108. Since lots 141-143 each have the same base priority, the selection of which one of lots 141-143 to advance may be based on any other suitable factor, such as first-in-first-out, etc.

Figure 3:
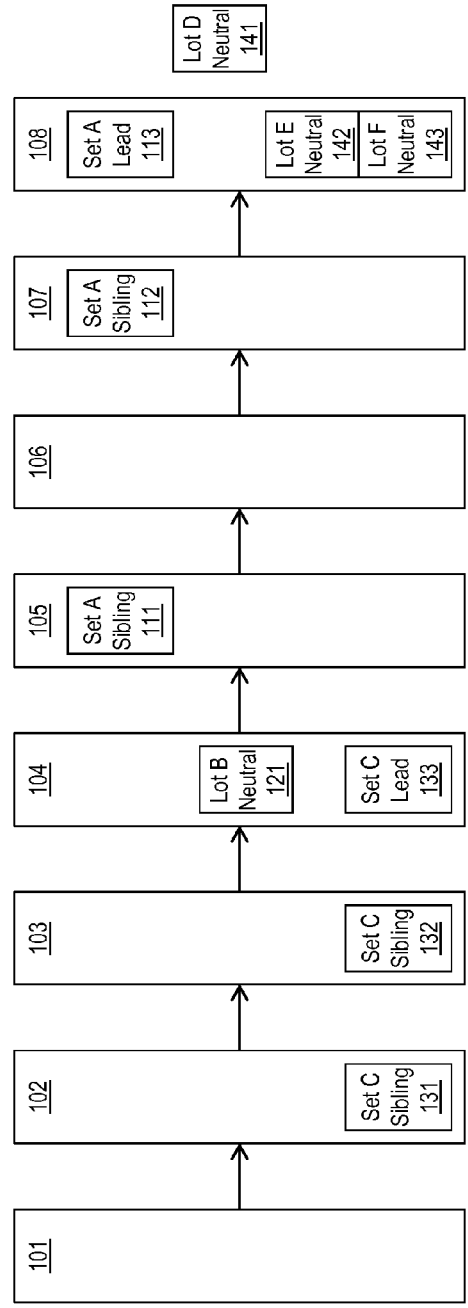

FIG. 4 illustrates a next iteration of advancing one lot from each gate using FIG. 3 as a starting point, wherein the selection of which lot to advance from each gate is determined according to the base priority and sibling-type priority of each lot as described herein. For example, starting from FIG. 3, each of gates 102, 103, 105, and 107 advances their single lot to the next gate as shown in FIG. 4. Also starting from FIG. 3, gate 104 advances lot 121 and holds lot 133 (e.g., as depicted in FIG. 4) since both lots have the same base priority, lot 121 has a neutral priority, and lot 133 has a lead priority. This demonstrates how a neutral lot is selected over a lead lot to permit siblings related to the lead lot to advance toward the lead lot.

FIG. 4 also depicts a situation in which a trailing sibling lot has caught up with the lead lot for a particular set of sibling lots. For example, in FIG. 4, related lots 132 and 133 are both at gate 104. Similarly, related lots 112 and 113 are both at gate 108. In embodiments, when a sibling lot catches a lead lot, both lots are assigned the sibling-type priority of 'lead' since both lots are at the furthest downstream location compared to other related lots in the sibling set. Thus, in FIG. 4, lots 132 and 133 are both assigned sibling-type priority of 'lead' while lot 131 remains the sibling-type priority of 'sibling'. Similarly, in FIG. 4, lots 112 and 113 are both assigned sibling-type priority of 'lead' while lot 111 remains the sibling-type priority of 'sibling'.

FIG. 5 illustrates a next iteration of advancing one lot from each gate using FIG. 4 as a starting point, wherein the selection of which lot to advance from each gate is determined according to the base priority and sibling-type priority of each lot as described herein. For example, starting from FIG. 4, each of gates 103, 105, and 106 advances their single lot to the next gate as shown in FIG. 5. Also starting from FIG. 4, gate 104 advances lot 133 and holds lot 132 as depicted in FIG. 5. Since lots 132 and 133 have the same base priority and the same sibling-type priority in FIG. 4, any other suitable parameter may be used to select which one advances from gate 104 in the step between FIG. 4 and FIG. 5 (e.g., first-in-first-out). Also starting from FIG. 4, gate 108 advances lot 143 and holds lots 112 and 113 as depicted in FIG. 5. This is because lot 143 has a more urgent base priority than lots 112 and 113.

FIG. 5 also depicts a situation in which a sibling set that previously had plural lead lots has changed to having a single lead lot. Particularly, in FIG. 4 lots 132 and 133 both had sibling-type priority 'lead'. However, in FIG. 5, lot 133 alone has advanced to the most downstream position for this particular sibling set, such that lot 132 is no longer at the most downstream position for this sibling set. As such, the sibling-type priority for lot 132 is changed back to 'sibling' at FIG. 5.

As depicted by FIGS. 2-5, the flow of lots can be controlled in accordance with aspects of the invention to cause sibling lots to catch up to the lead lot of a sibling set while still operating according to base priority rules. For example, FIG. 2 shows lots 111-113 spread out over five gates, and lots 131-133 spread out over four gates. FIG. 5, on the other hand, shows that lots 111-113 and lots 131-133 are each spread out over just two gates. In this manner, implementations of the invention may be used to manage the flow of lots based on sibling-type priority in addition to base priority to minimize the extent to which related sibling lots are spread out over a manufacturing line.

FIG. 6 shows an exemplary data structure 200 that may be used to implement the sibling-type priorities in accordance with aspects of the invention. In embodiments, the data structure 200 includes a table having a plurality of rows 201-206 where each row corresponds to an individual lot in a manufacturing line. The rows are divided into columns 211-216 that include the following data for each lot: Lot ID (column 211); Demand Date (column 212); Base Priority (column 213); Gate (column 214); Sibling-Type Priority (column 215); and Composite Priority (column 216). The invention is not limited to the exemplary data structure shown in FIG. 6, and any suitable data structures (including those with different numbers of rows and/or columns, and containing different types of data) may be used with aspects of the invention.

In embodiments, the base priority 213 may be numeric data in which lower numbers indicate higher base priority (e.g., as based on the demand date). Also in embodiments, the sibling-type priority 215 may be numeric data in which a low number (e.g., 3) is assigned for 'neutral' priority, a middle number (e.g., 4) is assigned for 'sibling' priority, and a high number (e.g., 5) is assigned for 'lead' priority. Implementations of the invention may further utilize a composite priority 216 which is a concatenation of the base priority and the sibling-type priority for a particular lot. For example, for lot VV in row 202, the composite priority is 17.5 which is a concatenation of the base priority 17 and the sibling-type priority 5 for this lot. In this manner, all of the lots at any one gate (e.g., gate 8850) may be prioritized using the composite priority, e.g., by ordering the lots from lowest to highest composite priority. Then, when it is time to advance a lot from a gate, the lot with the lowest numerical composite priority is selected for advancement. Using the exemplary data in FIG. 6, lot UU would be selected for advancement next from gate 8850 over lots VV and WW based on the composite priority values.

System Environment

Figure 7:
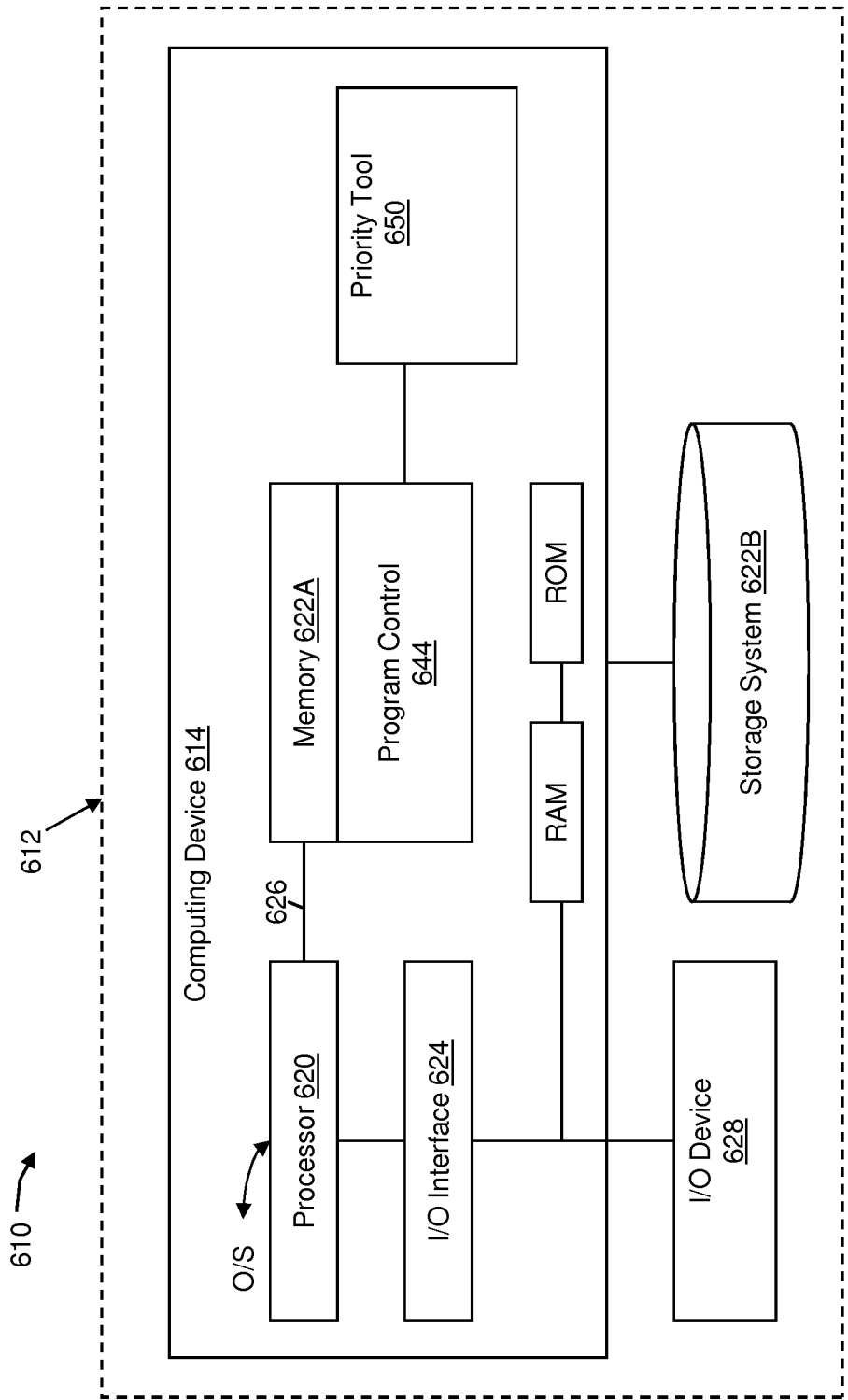
FIG. 7 shows an illustrative environment for performing the processes in accordance with the invention.

FIG. 7 shows an illustrative environment 610 for managing the processes in accordance with the invention. As will be appreciated by one skilled in the art, embodiments of the invention may be implemented as an independent entity or as part of a computer integrated manufacturing production system. Embodiments may be directly integrated into a floor control system and/or a manufacturing execution system, as is commonly used in directing the production of semiconductor fabrication. Although the invention is described herein with respect to semiconductor device fabrication, it is understood that embodiments could be employed in other manufacturing processes, such as, for example, automobile manufacture, etc.

Aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (also referred to as a computer usable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Still referring to FIG. 7, the environment 610 includes a server or other computing system 612 that can perform the processes described herein. In particular, the system 612 includes a computing device 614. The computing device 614 can be resident on a network infrastructure or computing device of a third party service provider (any of which is generally represented in FIG. 7).

The computing device 614 also includes a processor 620, memory 622A, an I/O interface 624, and a bus 626. The memory 622A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 614 is in communication with the external I/O device/resource 628 and the storage system 622B. For example, the I/O device 628 can comprise any device that enables an individual to interact with the computing device 614 (e.g., user interface) or any device that enables the computing device 614 to communicate with one or more other computing devices using any type of communications link. The external I/O device/resource 628 may be for example, a handheld device, PDA, handset, keyboard etc.

In general, the processor 620 executes computer program code (e.g., program control 644), which can be stored in the memory 622A and/or storage system 622B. Moreover, in accordance with aspects of the invention, the program control 644 controls a priority tool 650, e.g., that performs one or more of the processes described herein (e.g., assigns a sibling-type priority and/or controls flow of WIP based in part on sibling-type priority). The priority tool 650 can be implemented as one or more program code in the program control 44 stored in memory 622A as separate or combined modules. Additionally, the priority tool 650 may be implemented as separate dedicated processors or a single or several processors to provide the function of these tools. While executing the computer program code, the processor 620 can read and/or write data to/from memory 622A, storage system 622B, and/or I/O interface 624. The program code executes the processes of the invention. The bus 626 provides a communications link between each of the components in the computing device 614.

The computing device 614 can comprise any general purpose computing article of manufacture capable of executing computer program code installed thereon (e.g., a personal computer, server, etc.). However, it is understood that the computing device 614 is only representative of various possible equivalent-computing devices that may perform the processes described herein. To this extent, in embodiments, the functionality provided by the computing device 614 can be implemented by a computing article of manufacture that includes any combination of general and/or specific purpose hardware and/or computer program code. In each embodiment, the program code and hardware can be created using standard programming and engineering techniques, respectively.

Similarly, the system 612 is only illustrative of various types of computer infrastructures for implementing the invention. For example, in embodiments, the system 612 comprises two or more computing devices (e.g., a server cluster) that communicate over any type of communications link, such as a network, a shared memory, or the like, to perform the process described herein. Further, while performing the processes described herein, one or more computing devices on the system 612 can communicate with one or more other computing devices external to the system 612 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Flow Diagrams

Figure 8:
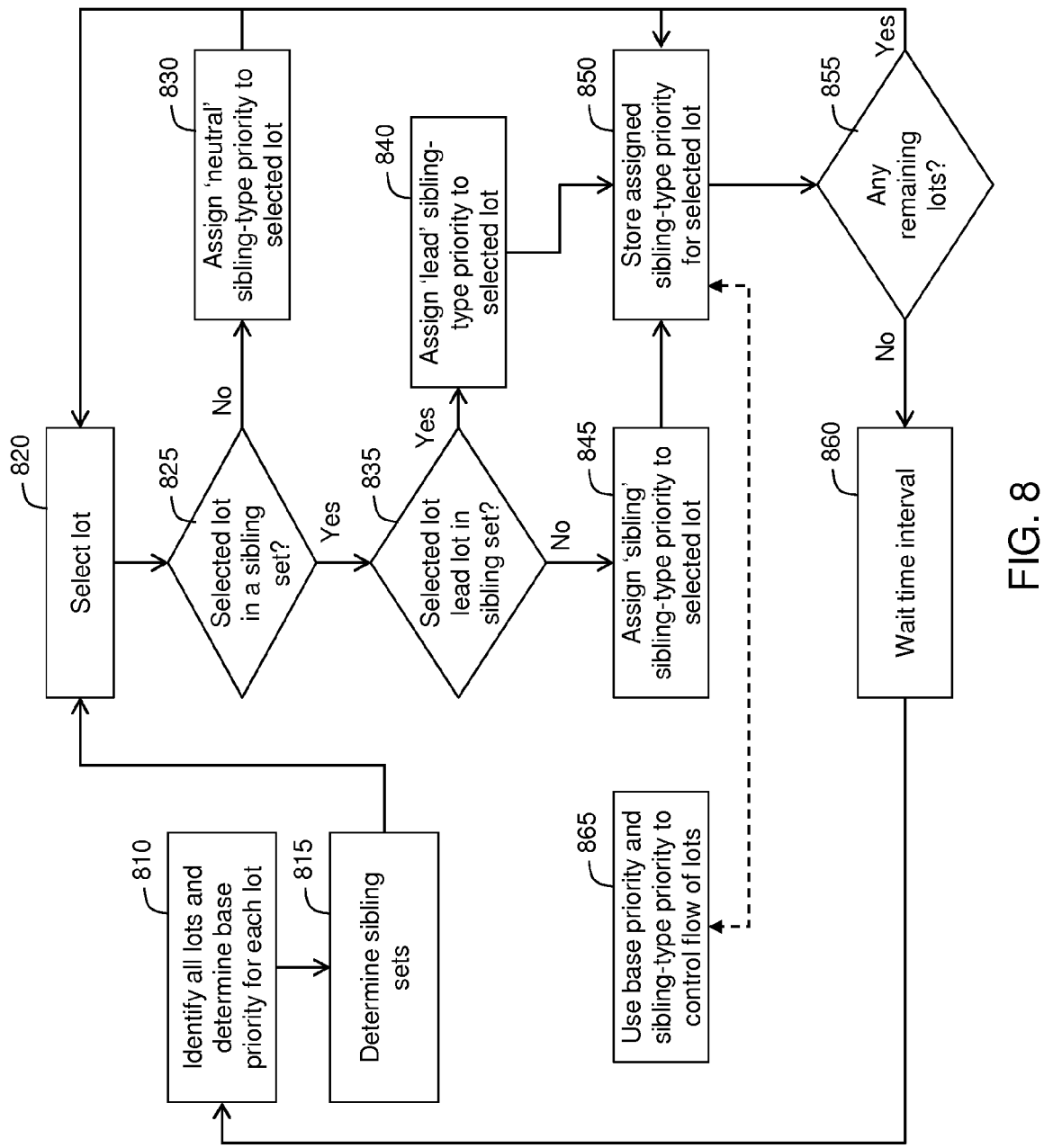
FIGS. 8 and 9 show flow diagrams depicting steps of methods in accordance with aspects of the invention.
Figure 9:
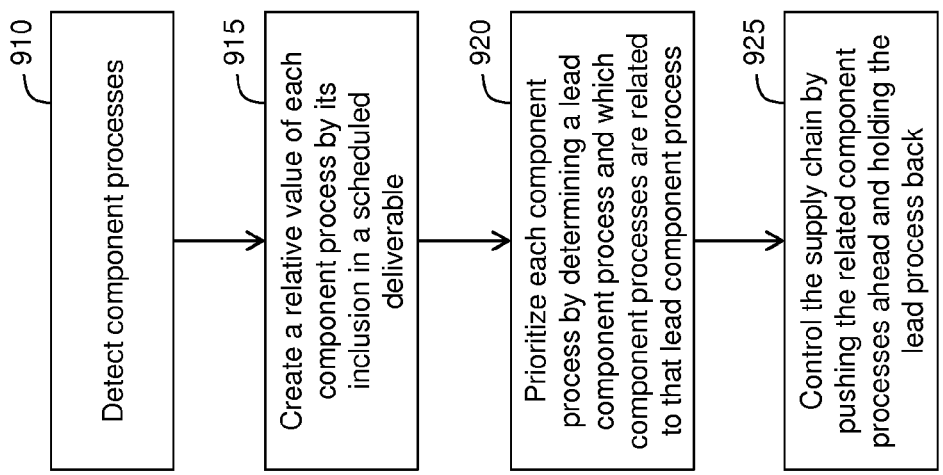

FIGS. 8 and 9 show exemplary flows for performing aspects of the present invention. The steps of FIGS. 8 and 9 may be implemented utilizing one or more aspects of FIGS. 1-7, for example.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 7. The computer-usable or computer readable medium can be of the type described herein.

FIG. 8 shows a flow diagram of a process in accordance with aspects of the invention. At step 810, all of the active lots of WIP are identified and a base priority is determined for each lot. This may include, for example, identifying every lot that is currently in any stage of production in one or more fabrication facilities (e.g., at any node in FIG. 1). The lots are identified and the base priority determined by accessing existing data of the one or more fabrication facilities, for example. The existing data may be, for example: a conventional floor control system; a database that tracks all of the lots in one or more fabrication facilities; a manufacturing execution system that monitors the lots, operations, ranges, and flows of one or more fabrication facilities; or a combination of any such systems. The system and method may access the existing data via the I/O device 28 or in any other suitable manner. Step 810 may be performed at any time interval as determined by the needs of the one or more fabrication facilities. For example, the active lots may be identified and base priority determined twice a day, hourly, every twenty minutes, or at any other desired time interval.

At step 815, the priority tool (e.g., priority tool 650 running on computing device 614) determines sibling sets included in all of the lots that were identified at step 810. The sibling sets may be determined from existing data such as that described with respect to step 810, which data can be analyzed by the priority tool to identify all sibling lots that are related as being split from a parent lot (e.g., identify all sibling sets and the lots included in each sibling set).

At step 820, the priority tool selects one of the lots (e.g., identified at step 810) for assigning a sibling-type priority. At step 825, the priority tool determines whether the selected lot (e.g., from step 820) is included in a sibling set (e.g., as determined at step 815). In the event the selected lot is not part of a sibling set, then at step 830 the priority tool assigns a sibling-type priority of 'neutral' to the selected lot. In the event the selected lot is included in a sibling set, then at step 835 the priority tool determines whether the selected lot is the lead lot of the sibling set to which it belongs. In embodiments, the priority tool determines the lead lot of a sibling set by analyzing the relative positions (e.g., gates, etc.) of all the lots in the sibling set to which the selected lot belongs, and designates a lot as a lead lot in a manner similar to that described with respect to FIGS. 2-5. For example, a lot may be considered a lead lot of a sibling set when the lot is not behind any other lots of the sibling set along the process route.

In the event the selected lot is determined to be a lead lot at step 835, then at step 840 the priority tool assigns a sibling-type priority of 'lead' to the selected lot. On the other hand, when the selected lot is determined to not be a lead lot at step 835, then at step 845 the priority tool assigns a sibling-type priority of 'sibling' to the selected lot. Following any one of steps 830, 840, and 845, the priority tool stores the sibling-type priority of the selected lot at step 850, e.g., in a floor control system and/or manufacturing execution system. In embodiments, step 850 may comprise the priority tool storing the assigned sibling-type priority as a value (e.g., a numeric value) in a data structure such as data structure 200 of FIG. 6, or other similar data structure of the floor control system and/or manufacturing execution system that can be used to control the flow of lots through a manufacturing facility.

At step 855, the priority tool determines whether there are any lots remaining to for assigning a sibling-type priority. If there are lots remaining, then the process returns to step 820 to select a next lot for analysis. If there are no lots remaining, then the process pauses for a predefined amount of time at step 860 before returning to step 810 to begin a next iteration. In this manner, every lot in the supply chain may be assigned a sibling-type priority on a predefined time interval. At step 865, at any time during the process, the sibling-type priority may be used in conjunction with the base priority to control the flow of the lots within the supply chain, e.g., as described with respect to FIGS. 2-6.

FIG. 9 shows a flow diagram of a process in accordance with aspects of the invention. At step 910, the priority tool (e.g., priority tool 650 running on computing device 614) detects component processes, which may be siblings of a delivery item. In embodiments, step 910 includes determining the sibling sets (e.g., sets of related lots split from a single parent) through a manufacturing line and/or supply chain. This may be similar to step 815 and may be accomplished by mining data that exists for each lot, such as a universal lot label that identifies silicon relationships (e.g., parent wafer lot) of each WIP lot using a string of characters. Additionally or alternatively, step 910 may be accomplished by using a parentage processes that also maintains lot-to-lot relationships when a split occurs. In a complex WIP process a single part number may be divided into multiple part numbers as processing continues, which produces a divergence of relative need amongst the a set. In embodiments, this divergence is avoided by adjusting a sibling identifier by merging in a lot part number, which produces multiple sub-sibling sets and allows managing each subset as business needs require.

At step 915, the priority tool creates a relative value of each component process by its inclusion in a scheduled deliverable. In embodiments, each sibling set identified in step 910 is assigned a relative worth, which may be based on, for example, demand, business valuations, etc., for each lot in a sibling set. Step 915 may comprise excluding from the valuation lots of the sibling set that are not intended for sale. For example, most production lines have engineering parts that are not intended for client sale. In embodiments, the relative worth of a sibling set is determined by removing the non-salable segments of the sibling-set (e.g., the engineering parts, etc.) that by definition move slowly or not at all toward the end of the line.

At step 920, the priority tool prioritizes each component process by determining a lead component process and which component processes are related to that lead component process according to sibling relationships. In embodiments, this comprises identifying the lead lot(s) and sibling lot(s) for each sibling set, and assigning a lead priority or a sibling priority to each lot in the sibling set. This may be accomplished similar to steps 825 . . . 850 described in FIG. 8. One exemplary metric is to select an attribute and determine a mean and standard deviation of that attribute as it pertains to a sibling set. In embodiments, the attribute is the gate where each lot in the sibling set is located, the gate being the identifier of where the lot is along its process route. The priority tool may be programmed with optimization logic that determines a mean and a standard deviation for the sibling set according to 'deltagate' for each lot in the sibling set (e.g., the lead lot gate location minus a sibling lot gate location), and controls the flow of lots to drive that standard deviation downward toward zero. In implementations, two techniques are used to drive the mean and a standard deviation downward: investing resource into the siblings to drive them toward the lead lot, and not investing resources in the lead lot thus slowing down the lead lot to allow the siblings more time to catch up to the lead lot.

At step 925, the priority tool controls the supply chain by pushing the related component processes ahead and holding the lead process back based on the prioritizing of step 920. In embodiments, this comprises controlling the flow of all lots based on the combination of base priority and sibling-type priority, e.g., as described with respect to FIGS. 2-6. For example, for a gate that contains plural lots with different base priorities, the lot with the higher base priority (e.g., more urgent base priority, earlier demand date, etc.) is moved ahead before the lot with the lower base priority (e.g., less urgent base priority, later demand date, etc.). Also, for a gate that contains plural lots all having a same base priority, lots having 'sibling' priority are moved before lots having 'neutral' priority, and lots having 'neutral' priority are moved before lots having 'lead' priority. Moreover, when a gate contains only a single lot, that single lot is advanced to the next gate, irrespective of the sibling-type priority. In this manner, the controlling flow of the plurality of lots at step 925 (and similarly at step 865) comprises selecting a lot for advancement from a gate based on a hierarchy having an order of: base priority first, sibling sibling-type priority second, neutral sibling-type priority third, and lead sibling-type priority fourth.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A supply chain management system for controlling component processes, comprising:
   a computer device that is adapted to:
      detect a plurality of component processes, comprising identifying sibling lots in a manufacturing line, wherein the sibling lots have been split from a parent lot, and
   wherein the sibling lots of the parent lot all undergo same processes in the manufacturing line after having been split;
      create a relative value of each one of the plurality of component processes;
      prioritize each one of the plurality of component processes according to sibling relationships, wherein the prioritizing comprises assigning a sibling-type priority to each lot in each one of the plurality of component processes, and the sibling-type priority for each lot is selected from the group consisting of: lead, sibling, and neutral; and
      control a flow of the plurality of component processes in the manufacturing line based on the prioritizing.

2. The system of claim 1, wherein:
   the component processes span plural manufacturing sectors and plural manufacturing sites; and
   the controlling the flow is based on both the prioritizing and in support of on time delivery (OTD) goals.

3. The system of claim 1, wherein the creating the relative value for one of the plurality of component processes comprises identifying engineering parts included in the one of the plurality of component processes and excluding the engineering parts from the relative value.

4. The system of claim 1, wherein the controlling the flow comprises selecting a first lot for advancement over a second lot based on the sibling-type priority of the first lot and the sibling-type priority of the second lot.

5. A method of managing lots in a supply chain, comprising:
   identifying a plurality of lots;
   determining a base priority for each of the plurality of lots;
   assigning a sibling-type priority to each of the plurality of lots;
   controlling flow of the plurality of lots based on the base priority of each of the plurality of lots and the sibling-type priority of each of the plurality of lots, wherein the determining, the assigning, and the controlling are performed by a computer device; and
   determining sibling sets included in the plurality of lots, wherein:
      the plurality of lots comprise semiconductor devices;
      the sibling sets comprise sub-lots that have been split from a parent lot of wafers; and
      the sibling lots of the parent lot all undergo same processes in the manufacturing line after having been split.

6. The method of claim 5, wherein the base priority is determined from a demand date or a delivery date for each one of the plurality of lots.

7. The method of claim 5, wherein the assigning the sibling-type priority to each of the plurality of lots comprises:
   assigning a first sibling-type priority to a first lot based on determining the first lot is included in one of the sibling sets without being a lead lot;
   assigning a second sibling-type priority to a second lot based on determining the second lot is not included in one of the sibling sets; and
   assigning a third sibling-type priority to a third lot based on determining the third lot is a lead lot of one of the sibling sets.

8. The method of claim 5, wherein the controlling flow of the plurality of lots comprises selecting a first lot for advancement over a second lot based on the base priority and the sibling-type priority of the first lot and the base priority and the sibling-type priority of the second lot.

9. The method of claim 5, further comprising repeating the identifying, the determining, and the assigning at a predefined time interval.

10. The method of claim 5, wherein the sibling-type priority is one of: lead, sibling, and neutral.

11. The method of claim 10, wherein the controlling flow of the plurality of lots comprises selecting a lot for advancement from a gate based on a hierarchy having an order of: base priority first, sibling sibling-type priority second, neutral sibling-type priority third, and lead sibling-type priority fourth.

12. The method of claim 5, further comprising storing the base priority and the sibling-type priority of each one of the plurality of lots in a data structure.

13. The method of claim 12, further comprising accessing the data structure to obtain the base priority and the sibling-type priority of each one of the plurality of lots when performing the controlling.

14. The method of claim 12, further comprising creating a composite priority for each one of the plurality of lots based on the base priority and the sibling-type priority of each one of the plurality of lots.

15. The method of claim 5, wherein:
the base priority for each of the plurality of lots is determined based on demand dates of the plurality of lots; and
the sibling-type priority for each of the plurality of lots is selected from the group consisting of: lead, sibling, and neutral.

16. A computer program product for managing lots, the computer program product comprising a non-transitory computer readable storage medium having program code embodied therewith, the program code being readable and/or executable by a processor of a computer device to perform a method comprising:
identifying, by the processor, lots in a manufacturing line;
determining, by the processor, a base priority for each of the lots;
identifying, by the processor, sibling sets of the lots;
assigning, by the processor, a sibling-type priority to each of the lots; and
controlling, by the processor, movement of the lots at discrete locations in the manufacturing line based on a combination of the base priority for each of the lots and the sibling-type priority of each of the lots,
wherein the sibling sets comprise sub-lots that have been split from a parent lot of the semiconductor wafers;
the assigning the sibling-type priority comprises:
assigning a first sibling-type priority to first ones of the lots that are included in one of the sibling sets and are not a lead lot;
assigning a second sibling-type priority to second ones of the lots that are not included in one of the sibling sets;
assigning a third sibling-type priority to third ones of the lots that are a lead lot of one of the sibling sets; and
the sub-lots of the parent lot all undergo same processes in the manufacturing line after having been split.

17. The computer program product of claim 16, wherein:
the lots comprise all lots in the manufacturing line;
the lots comprise semiconductor wafers; and
the controlling the movement of the lots comprises selecting a lot for advancement from a gate in the manufacturing line based on a hierarchy having an order of: base priority first, first sibling-type priority second, second sibling-type priority third, and third sibling-type priority fourth.

18. The computer program product of claim 17, wherein each one of the lots in the manufacturing line is assigned the base priority based on a respective demand date;
each one of the lots in the manufacturing line is assigned the sibling-type priority from a group consisting of: the first sibling-type priority, the second sibling-type priority, and the third sibling-type priority;
each one of the lots in the manufacturing line is assigned a composite priority that is a concatenation of the base priority and the sibling-type priority.

* * * * *